(12) United States Patent
Kim

(10) Patent No.: US 10,257,569 B2
(45) Date of Patent: Apr. 9, 2019

(54) DISPLAY APPARATUS AND METHOD FOR PROVIDING SERVICE THEREOF

(71) Applicant: SAMSUNG ELECTRONICS CO., LTD., Suwon-si (KR)

(72) Inventor: Hye-won Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/868,539

(22) Filed: Jan. 11, 2018

(65) Prior Publication Data

US 2018/0199101 A1    Jul. 12, 2018

(30) Foreign Application Priority Data

Jan. 11, 2017  (KR) ........................ 10-2017-0004192
Nov. 24, 2017  (KR) ........................ 10-2017-0157854

(51) Int. Cl.

| | |
|---|---|
| H04N 21/44 | (2011.01) |
| H04N 21/234 | (2011.01) |
| H04N 21/658 | (2011.01) |
| H04N 21/437 | (2011.01) |
| H04N 21/45 | (2011.01) |
| H04N 21/4415 | (2011.01) |
| H04N 21/81 | (2011.01) |

(Continued)

(52) U.S. Cl.
CPC . *H04N 21/44008* (2013.01); *H04N 21/23418* (2013.01); *H04N 21/437* (2013.01); *H04N 21/4415* (2013.01); *H04N 21/4532* (2013.01); *H04N 21/47815* (2013.01); *H04N 21/6581* (2013.01); *H04N 21/8133* (2013.01); *H04N 21/4223* (2013.01)

(58) Field of Classification Search
CPC combination set(s) only.
See application file for complete search history.

(56) References Cited

U.S. PATENT DOCUMENTS

| | | | |
|---|---|---|---|
| 8,126,774 | B2 | 2/2012 | Hendrickson et al. |
| 8,910,201 | B1 | 12/2014 | Zamiska et al. |
| 9,224,037 | B2 | 12/2015 | Anabuki et al. |

(Continued)

FOREIGN PATENT DOCUMENTS

| | | |
|---|---|---|
| KR | 10-2008-0025958 A | 3/2008 |
| KR | 101589957 B1 | 2/2016 |
| WO | 2013/086257 A1 | 6/2013 |

OTHER PUBLICATIONS

International Search Report (PCT/ISA/210) dated Apr. 19, 2018, issued by the International Searching Authority in International Application No. PCT/KR2018/000444.

(Continued)

*Primary Examiner* — Alexander Gee
(74) *Attorney, Agent, or Firm* — Sughrue Mion, PLLC

(57) ABSTRACT

A display apparatus and a method for providing a service thereof are provided. The display apparatus includes a display and a processor configured to control the display to display content, recognize the content being displayed, recognize one or more objects in a currently displayed screen of the content, identify a user who is using the display apparatus, select one of the recognized one or more objects based on information on the identified user, and provide a service related to the selected object to the identified user.

17 Claims, 14 Drawing Sheets

(51) Int. Cl.
H04N 21/478 (2011.01)
H04N 21/4223 (2011.01)

(56) References Cited

U.S. PATENT DOCUMENTS

| | | |
|---|---|---|
| 9,258,626 B2 | 2/2016 | Jo |
| 9,420,319 B1* | 8/2016 | Story, Jr. ............. G06Q 30/0631 |
| 2007/0033607 A1* | 2/2007 | Bryan .................... H04H 60/27 |
| | | 725/10 |
| 2012/0128241 A1 | 5/2012 | Jung |
| 2013/0016910 A1* | 1/2013 | Murata .............. H04N 21/4725 |
| | | 382/195 |
| 2013/0047180 A1* | 2/2013 | Moon ................ H04N 21/4122 |
| | | 725/30 |
| 2013/0141645 A1* | 6/2013 | Barnes ............... H04N 5/44582 |
| | | 348/564 |
| 2013/0282532 A1 | 10/2013 | Shihadah et al. |
| 2016/0112746 A1* | 4/2016 | Zhang ................ H04N 21/4122 |
| | | 725/81 |
| 2016/0127759 A1 | 5/2016 | Jung et al. |
| 2016/0127775 A1 | 5/2016 | Zilberstein et al. |

OTHER PUBLICATIONS

Written Opinion (PCT/ISA/237) dated Apr. 19, 2018, issued by the International Searching Authority in International Application No. PCT/KR2018/000444.

* cited by examiner

DISPLAY APPARATUS AND METHOD FOR PROVIDING SERVICE THEREOF

CROSS-REFERENCE TO RELATED APPLICATIONS

This application claims priority from Korean Patent Application No. 10-2017-0004192, filed on Jan. 11, 2017 in the Korean Intellectual Property Office, and Korean Patent Application No. 10-2017-0157854, filed on Nov. 24, 2017 in the Korean Intellectual Property Office, the disclosures of which are incorporated herein by reference in their entireties.

BACKGROUND

1. Field

Apparatuses and methods consistent with example embodiments of present disclosure relate to providing a service thereof, and more specifically, to the display apparatus which provides a customized automatic content recognition (ACR) service to a user who is using the display apparatus and the method for providing a service thereof.

Apparatuses and methods consistent with example embodiments of the present disclosure also generally relate to an artificial intelligence (AI) system which simulates a cognitive or determining function of a human brain by using a machine learning algorithm (or machine training algorithm), such as, deep learning, and applications thereof.

2. Description of the Related Art

The AI system refers to a computer system mimicking or approximating intelligence of a human. The AI system is characterized by a machine's ability to learn, determine, and become smarter on its own unlike the existing rule-based smart system. The more a user uses the AI system, the AI system provides better recognition rate and better understanding on the user's taste or interests. In this regard, the existing rule-based smart system is being replaced with a deep learning-based AI system.

The AI technologies include machine learning (e.g., deep learning) and element technologies using the machine learning. The machine learning refers to an algorithm whereby a machine classifies and learns characteristics of input data for itself. The element technologies refer to technologies of simulating cognitive or determining function of a human brain by using a machine learning algorithm, such as, deep learning, and may be divided into fields of linguistic understanding, visual understanding, reasoning/prediction, knowledge representation, and operation control.

The AI technologies may be applied to various fields. The linguistic understanding refers to a technology of recognizing, applying, and processing verbal/written languages of a human and includes natural language processing, machine translation, a conversation system, question and answer, and voice recognition/synthesis. The visual understanding refers to a technology of recognizing and processing objects in a human's viewpoint and includes object recognition, object tracking, image search, human recognition, scene understanding, space understanding, and image improvement. The reasoning/prediction refers to a technology of determining information and executing logical reasoning and prediction and includes knowledge/probability-based reasoning, optimization prediction, preference-based planning, and recommendation. The knowledge representation refers to a technology of processing human experience information to be automated knowledge data and includes knowledge construction (generating/classifying data) and knowledge management (utilizing data). The operation control refers to a technology of controlling automated driving of a vehicle and a motion of a robot and includes motion control (e.g., navigation, collision, driving, etc.) and manipulation control (e.g., behavior control).

Recently, an automatic content recognition (ACR) method has been developed. The ACR method may enable a display apparatus to recognize content which is currently displayed in the display apparatus. As the display apparatus recognizes content which a user is viewing, the display apparatus may provide an intelligent service, such as, targeted advertising, content recommendation, relevant information retrieval, and so on.

However, the display apparatus in a household or in a public place is used by several people. Accordingly, the display apparatus provides information on the same product or service to the several people who use the display apparatus.

The respective users may prefer different products or services, but the conventional ACR-based service provides a service suitable for only some of the users.

SUMMARY

According to an aspect of an example embodiment, there is provided a display apparatus. The apparatus may include a display configured to display content and a processor configured to control the display to display content, recognize the content being displayed, recognize one or more objects in a currently displayed screen of the content, identify a user who is using the display apparatus, select one of the recognized one or more objects based on information on the determined user, and provide a service related to the selected object to the determined user.

The apparatus may further include a communicator. The processor may be further configured to control the communicator to communicate with a server, obtain a fingerprint by extracting a feature of the currently displayed screen, control the communicator to send a query for content information corresponding to the generated fingerprint to the server, and recognize the content by using the content information received from the server.

The processor may be further configured to recognize a first object corresponding to a product in the currently displayed screen, recognize a second object corresponding to a person in the currently displayed screen based on metadata of the recognized content, and cluster the recognized first and second objects.

The processor may be further configured to determine a relation between the person and the product based on locations in the currently displayed screen, cluster the recognized first and second objects in response to determining that the person and the product are related, and filter out the first object in response to determining that the person and the product are unrelated.

In response to the determined user being a plurality of users, the processor may determine one of the plurality of users as the user who is using the display apparatus for every screen of the content.

The processor may be further configured to identify a preference ranking of the one or more objects and identify the user based on a highest preference for an object in a highest rank among the plurality of users.

The apparatus may further include an input unit. The processor may be further configured to control the input interface to receive biometric information on the user, identify the user who is using the display apparatus by comparing the biometric information received through the input unit and pre-stored biometric information.

The apparatus may further include a camera. The processor may be further configured to control the camera to photograph an image, identify the user included in the image of a predetermined area photographed by the camera.

According to an aspect of an example embodiment, there is provided a method for providing a service of a display apparatus. The method may include recognizing content being played, recognizing one or more objects in a currently displayed screen of the content, identifying a user who is using the display apparatus, selecting one of the recognized one or more objects based on information on the determined user, and providing the service related to the selected object to the determined user.

The recognizing the content may include obtaining a fingerprint by extracting a feature of the currently displayed screen, sending a query for content information corresponding to the generated fingerprint to a server, and recognizing the content by using the content information received from the server.

The recognizing the one or more objects may include recognizing a first object corresponding to a product in the currently displayed screen, recognizing a second object corresponding to a person in the currently displayed screen based on metadata of the recognized content, and clustering the recognized first and second objects.

The clustering the first and second objects may include determining a relation between the person and the product based on locations in the currently displayed screen, and clustering the recognized first and second objects in response to determining that the person and the product are related, and filtering out the first object in response to determining that the person and the product are unrelated.

In response to the determined user being a plurality of users, the determining the user may include identifying one of the plurality of users as the user who is using the display apparatus for every screen of the content.

The determining the user may include identifying a preference ranking of the one or more objects, and identifying the user based on a highest preference for an object in a highest rank among the plurality of users.

The determining the user may include receiving biometric information on the user, and determining the user who is using the display apparatus by comparing the received biometric information and pre-stored biometric information.

The determining the user may include photographing an image of a predetermined area in front of the display apparatus, and identifying the user included in the photographed image.

According to an aspect of an example embodiment, there is provided a display apparatus using an artificial intelligence (AI) neural network model. The display apparatus may include a display and a processor configured to control the display to display content, recognize the content being displayed, recognize one or more objects in a currently displayed screen of the content by inputting the recognized content in the AI neural network model, identify a user who is using the display apparatus, select one object of the recognized one or more objects based on information on the determined user, and provide a service related to the selected object to the determined user.

According to one or more example embodiments of the present disclosure, the display apparatus may provide customized ACR-based services to the respective users.

BRIEF DESCRIPTION OF DRAWINGS

The above and/or other aspects will be more apparent by describing certain example embodiments with reference to the accompanying drawings, in which.

DETAILED DESCRIPTION OF EXAMPLE EMBODIMENTS

Figure 1:
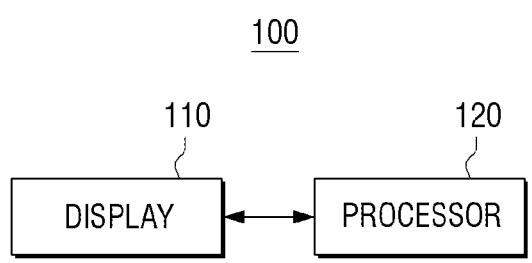
FIG. 1 is a block diagram illustrating a simple structure of a display apparatus according to an example embodiment.

Example embodiments are described below in greater detail with reference to the accompanying drawings. In the following description, like drawing reference numerals are used for the like elements, even in different drawings. The matters defined in the description, such as detailed construction and elements, are provided to assist in a comprehensive understanding of example embodiments. However, example embodiments can be practiced without those specifically defined matters. Also, well-known functions or constructions are not described in detail since they would obscure the application with unnecessary detail. The terms used in the following description are expressions defined by considering functions in the present disclosure and may vary depending upon intentions of a user or an operator or practices. Accordingly, the terms should be defined based on overall descriptions of the present disclosure.

In the following description, terms with an ordinal, for example, "first" or "second," may be used to describe various elements, but the elements are not limited by the term. The terms including the ordinal are used only to distinguish the same or similar elements and they do not necessarily imply order, preference, or significance. By way of example, "first" element may be referred to as "second" element, and the "second" element may be also referred to as the "first" element without deviating from the scope of right of the present disclosure. The term "and/or" includes any one or combinations of a plurality of related elements.

The expression, "at least one of a and b," should be understood as including only a, only b, or both a and b. Similarly, the expression, "at least one of a, b, and c," should be understood as including only a, only b, only c, both a and b, both a and c, both b and c, or all of a, b, and c.

The terms used in the following description are provided to describe example embodiments and are not intended to limit the scope of right of the present disclosure. A term in a singular form includes a plural form unless it is intentionally written that way. In the following description, terms, such as, "include" or "have," refer to the disclosed features, numbers, steps, operations, elements, parts, or combinations thereof and is not intended to exclude any possibilities of existence or addition of one or more other features, numbers, steps, operations, elements, parts, or combinations thereof.

In the example embodiments, the term "module" or "unit" refers to an element or component which performs one or more functions or operations. The "module" or "unit" may be implemented by hardware (e.g., a circuits, a microchip, a processor, etc.), software, or a combination thereof. A plurality of "modules" or "units" may be integrated into at least one module and realized as at least one processor, except for a case where the respective "modules" or "units" need to be realized as discrete specific hardware.

In the following description, a term "user" may refer to a person who is using an electronic apparatus or an apparatus which uses the electronic apparatus (for example, an AI electronic apparatus).

Hereinafter, example embodiments of the present disclosure will be described in detail with reference to the accompanying drawings.

FIG. 1 is a block diagram illustrating a simple structure of a display apparatus 100 according to an example embodiment. The display apparatus 100 may be a smart television (TV), but this is only an example. The display apparatus 100 may be realized as diverse kinds of apparatuses, such as, a projection TV, a monitor, a kiosk, a notebook personal computer (PC), a tablet PC, a smart phone, a personal digital assistant (PDA), an electronic picture frame, a table display device, and so on.

Referring to FIG. 1, the display apparatus 100 may include a display 110 and a processor 120.

The display 110 may display various image content, information, or a user interface (UI) provided by the display apparatus 100. For example, the display 110 may display a playback screen of diverse content provided in a form of live broadcasting or video on-demand (VOD).

The processor 120 may recognize what the currently played content is. As an example, the processor 120 may generate a fingerprint by extracting a feature of the displayed screen. Further, the processor 120 may perform an ACR operation by sending a query for the generated fingerprint to a server 200. As another example, the processor 120 may perform the ACR by comparing the generated fingerprint and a fingerprint database stored in a memory 160.

The fingerprint refers to feature data extracted from a video signal or an audio signal included in respective frames of content. The fingerprint may reflect intrinsic features of a signal unlike the metadata based on text.

The term "fingerprint" as used herein may refer to one fingerprint with respect to a specific image or refer to a fingerprint list including a plurality of fingerprints with respect to a specific image.

The processor 120 may determine a user who is using the display apparatus 100. As an example, the processor 120 may determine a user who is using the display apparatus 100 by receiving the biometric information. As another example, the processor 120 may determine a user who is using the display apparatus 100 by photographing the user and performing face detection (FD).

The processor 120 may provide a customized service by using the preference or use history of the determined user. In response to determining that there are multiple users, the processor 120 may determine a user to be provided with the service every frame (or screen) of the content.

The term "frame" as used herein refers to a series of data including information on an audio or an image. The frame may be the data of the audio or image that corresponds to a certain time. In the case of digital image content, the digital image content may include 30 to 60 images per second, and each of the 30 to 60 images may be referred to as a "frame." By way of example, a frame of image content, such as, a current frame or a next frame, may refer to one of respective images of the content which are displayed consecutively.

The processor 120 may recognize one or more objects in the currently displayed screen (or frame). For example, the objects may be a person or an object (e.g., a product) in the screen. The processor 120 may cluster the recognized person and product. That is, the processor 120 may sort the object recognized as the product related to the person.

The processor 120 may select one of the sorted objects based on the determined user's preference for the person. Further, the processor 120 may provide a service related to the selected object to the determined user.

As described above, the display apparatus 100 may provide a personalized ACR-based service.

Figure 2:
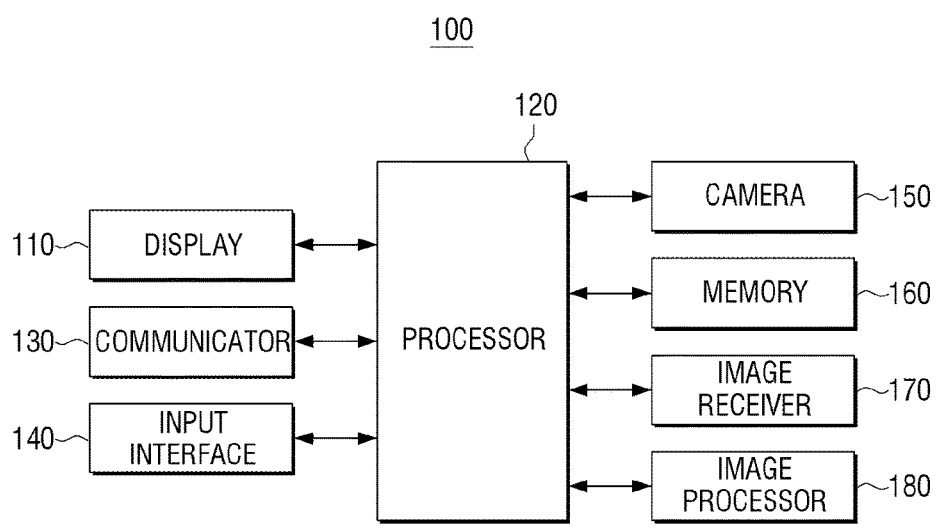
FIG. 2 is a block diagram illustrating a detailed structure of a display apparatus according to an example embodiment.

FIG. 2 is a block diagram illustrating a detailed structure of a display apparatus 100 according to an example embodiment. Referring to FIG. 2, the display apparatus 100 may include a display 110, a processor 120, a communicator 130, an input interface 140, a camera 150, a memory 160, an image receiver 170, and an image processor 180. One or more of the components illustrated in FIG. 2 and other figures may be implemented with hardware (e.g., circuits, microchips, processors, etc.), software, or a combination of both.

On top of the components of FIG. 2, the display apparatus 100 may further include an audio processor, an audio output interface, or a power supply. The display apparatus 100 may include more or fewer components that what is shown in FIG. 2.

The display 110 may display diverse image content, information, or UIs provided by the display apparatus 100. The display 110 may be realized as a liquid crystal display (LCD), an organic light-emitting diode (OLED) display, or a plasma display panel (PDP) to display various screens which may be provided through the display apparatus 100.

The communicator 130 communicates with the server 200 according to various kinds of communication methods. The communicator 130 may be connected with the server 200 in a wired and/or wireless manner and exchange fingerprint data. Further, the communicator 130 may transmit information on a specific frame of the content to the server 200 and request for recognition of the objects included in the frame. The communicator 130 may stream image data from an external server. The communicator 130 may include diverse communication chips supporting wired and/or wireless communications. By way of example, the communicator 130 may include the communication chips which operate in wired Local Area Network (LAN), wireless LAN, Wi-Fi, Bluetooth (BT), and near-field communication (NFC) methods.

The input unit 140 may receive various user instructions for controlling the display apparatus 100. Further, the input unit 140 may receive user's biometric information. The user's biometric information may include fingerprint information, iris information, voiceprint information, and so on. For example, the input unit 140 may be realized as a fingerprint recognition sensor on an ACR-function execution button to collect the fingerprint information on a user who pressed the ACR-function execution button.

The input unit 140 may be realized as a button or a touch pad or realized as a separate device, such as, a remote control. In the case of the input unit 140 realized as a touch pad, the input unit 140 may be realized as a touch screen in a mutual layer structure in combination with the display 110. The touch screen may detect a location, a dimension, or pressure of a touch input.

The camera 150 may photograph a still image or a video. For example, the camera 150 may continuously photograph a certain photographing area. The display apparatus 100 may detect a change which occurred in the photographing area by using a difference of the photographed image frames. By way of example, the camera 150 may photograph a certain area in front of the display apparatus 100, and the processor 120 may determine whether a user is present by using the photographed image. Further, the processor 120 may determine who the user in the image is through face detection (also referred to as face recognition).

The camera 150 may be realized as an image sensor, such as, a charge-coupled device (CCD) or a complementary metal-oxide semiconductor (CMOS). The CCD refers to a device where respective metal-oxide semiconductor (MOS) capacitors are located very close, and a charge carrier is transferred and stored in the capacitors. The CMOS image sensor refers to a device which employs a switching method of making MOS transistors corresponding to the number of pixels through a CMOS technology that uses a control circuit and a signal processing circuit as peripheral circuits and detecting outputs one by one using the MOS transistors.

The memory 160 may store diverse modules, software, and data for operating the display apparatus 100. For example, the memory 160 may store biometric information, view history information, or preference information on at least one user.

The memory 160 may be realized as a flash memory or a hard disk drive. For example, the memory 160 may include a read-only memory (ROM) which stores a program for operations of the display apparatus 100 and/or a random access memory (RAM) which stores data according to the operations of the display apparatus 100 temporarily. The memory 160 may further include an electrically erasable programmable ROM (EEPROM) which stores various reference data.

The image receiver 170 receives image content data through various sources. As an example, the image receiver 170 may receive broadcast data from an external broadcasting station. As another example, the image receiver 170 may receive the image data from an external apparatus (e.g., a set-top box or a digital versatile disc (DVD) player) or receive the image data streamed from an external server through the communicator 130.

The image processor 180 may perform image processing with respect to the image data received from the image receiver 170. To be specific, the image processor 180 may perform various image processing operations, such as, decoding, scaling, noise filtering, frame rate conversion, and resolution conversion, with respect to the image data.

The processor 120 may control the above components of the display apparatus 100. For example, the processor 120 may control the communicator 130 to send a query for content information corresponding to the generated fingerprint to the server 200. The processor 120 may be realized as single central processing unit (CPU) or realized a plurality of processors and/or an intellectual property (IP) core which performs a certain function.

A general-purpose processor (e.g., a CPU or an application processor) may perform the above-described operations, and certain operations may be performed by a dedicated hardware chip for the artificial intelligence (AI).

Hereinafter, the operations of the processor 120 will be described in further detail with reference to the accompanying drawings.

Figure 3:
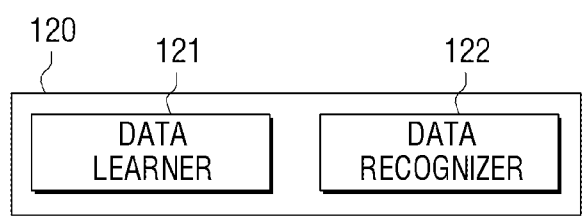
FIG. 3 is a block diagram illustrating a processor according to an example embodiment.

FIG. 3 is a block diagram illustrating a processor 120 according to an example embodiment. Referring to FIG. 3, the processor 120 may include a data learner 121 and a data recognizer 122.

The data learner 121 may learn the criteria for image analysis. The processor 120 may recognize the objects in the respective image frames according the learned criteria. The data learner 121 may decide which data to use in order to recognize the objects included in an image. Further, the data learner 121 may learn the criteria for object recognition by using the decided data. The data learner 121 may learn the criteria for image analysis by acquiring data to be used in the learning operation and applying the acquired data to a data recognition model. A detailed description on the data recognition model will be provided below.

The data recognizer 122 may recognize a situation from certain data by using the learned data recognition model. The data recognizer 122 may acquire certain data based on predetermined criteria through learning and use the data recognition model by utilizing the acquired data as an input value. By way of example, the data recognizer 122 may recognize the objects in the currently displayed screen by using a learned feature extraction model. The data recognizer 122 may update the data recognition model by utilizing the data which was acquired as a result value according to application of the data recognition model as the input value again.

At least one of the data learner 121 and the data recognizer 122 may be realized as at least one hardware chip or a plurality of hardware chips and installed in the display apparatus 100. By way of example, at least one of the data learner 121 and the data recognizer 122 may be realized as a dedicated hardware chip for the AI or realized as a part of a general-purpose processor (e.g., a CPU or an application processor) or a dedicated graphics processor (e.g., a graphics processing unit (GPU) or an image signal processor (ISP)) and installed in the above-described various display apparatuses 100.

In FIG. 3, the data learner 121 and the data recognizer 122 are installed in the display apparatus 100, but the data learner 121 and the data recognizer 122 may be installed in different display apparatuses, respectively. For example, one of the data learner 121 and the data recognizer 122 may be included in the display apparatus 100, and the other one may be included in the server 200. Further, the data learner 121 and the data recognizer 122 may be connected in a wired and/or wireless manner and transmit model information built by the data learner 121 to the data recognizer 122 or transmit data inputted in the data recognizer 122 to the data learner 121 as additional learning data.

At least one of the data learner 121 and the data recognizer 122 may be realized as a software module. In response to at least one of the data learner 121 and the data recognizer 122 being realized as a software module (or a program module including instructions), the software module may be stored in a non-transitory computer-readable medium. In this case, at least one software module may be provided by an operating system (OS) or provided by a certain application. Further, some of the at least one software module may be provided by the OS, and the other may be provided by the certain application.

Figure 4A:
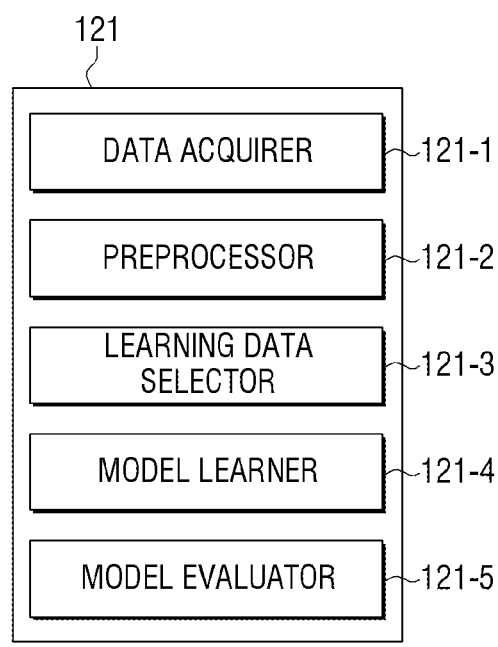
FIG. 4A is a block diagram illustrating a data learner according to an example embodiment.

FIG. 4A is a block diagram illustrating a data learner 121 according to some embodiments disclosed herein. Referring to FIG. 4A, the data learner 121 according to an example embodiment may include a data acquirer 121-1, a preprocessor 121-2, a learning data selector 121-3, a model learner 121-4, and a model evaluator 121-5.

The data acquirer 121-1 may acquire data necessary for determining a situation. For example, the data acquirer 121-1 may acquire an image frame by capturing a screen displayed in the display 110. The data acquirer 121-1 may receive the image data from an external apparatus, such as, a set-top box. The image data may consist of a plurality of image frames. Further, the data acquirer 121-1 may receive image data for learning through a network, such as, the server 200 or internet.

The preprocessor 121-2 may preprocess the acquired data so as to be used in the learning operation for determining a situation. The preprocessor 121-2 may process the acquired data to be in a predetermined format so the model learner 121-4 uses the acquired data for the learning operation for determining a situation. A detailed description on the model learner 121-4 will be provided below.

For example, the preprocessor 121-2 may perform the processing operations, such as, decoding, scaling, noise filtering, or resolution conversion, with respect to the received image data in order to make the image frames in the same format. Further, the preprocessor 121-2 may remove a background portion from the inputted image frames and convert the image frames to an image suitable for the object recognition.

The learning data selector 121-3 may select the data necessary for the learning from the preprocessed data. The selected data may be provided to the model learner 121-4. The learning data selector 121-3 may select the data necessary for the learning from the preprocessed data according to predetermined criteria for determining a situation. Further, the learning data selector 121-3 may select the data according to the criteria predetermined by the learning operation of the model learner 121-4. A detailed description on the model learner 121-4 will be provided below.

For example, in an initial stage of the learning operation, the learning data selector 121-3 may remove the image frames with high similarity from among the preprocessed image frames. That is, for the initial learning, the learning data selector 121-3 may select the data with low similarity so as to learn the criteria which are easily classified.

Further, the learning data selector 121-3 may select the preprocessed image frames which satisfy one of the criteria predetermined by learning in common. By this operation, the model learner 121-4 may learn criteria different from the previously learned criteria.

The model learner 121-4 may learn the criteria as to how to determine a situation based on the learning data. Further, the model learner 121-4 may learn the criteria as to which learning data to use for determining a situation.

By way of example, the model learner 121-4 may learn physical features for distinguishing images by comparing a plurality of image frames. The model learner 121-4 may learn the criteria for image analysis through a ratio of a foreground and a background, a size of objects, a location of objects, an arrangement, or extraction of a feature point in the image frames.

The model learner 121-4 may allow the data recognition model used for determining a situation to learn by using the learning data. In this case, the data recognition model may be a prebuilt model. For example, the data recognition model may be a model which was prebuilt by receiving basic learning data (e.g., a sample image frame).

The data recognition model may be built by considering application areas of a recognition model, a purpose of learning, or computer performance of an apparatus. The data recognition model may be a model based on a neural network, for example. By way of example, the models, such as, a deep neural network (DNN), a recurrent neural network (RNN), or a bidirectional recurrent deep neural network (BRDNN), may be used as the data recognition model, but not limited thereto.

The apparatus 100 may use an AI agent in order to perform the above-described operations. In this case, the AI agent may be a dedicated program for providing an AI-based service (e.g., a voice recognition service, an assistant service, a translation service, or a search service) and may be executed by the existing universal processor (e.g., a CPU) or other dedicated processor for the AI (e.g., a GPU).

In response to a plurality of prebuilt data recognition models being present, the model learner 121-4 may determine a data recognition model having higher relevancy between the inputted learning data and the basic learning data as a data recognition model to learn. In this case, the basic learning data may be pre-classified according to a type of the data, and the data recognition model may be prebuilt according to the type of the data. As an example, the basic learning data may be pre-classified according to various criteria, such as, a generated area, a generated time, a size, a genre, a constructor, and a type of objects of the learning data.

By way of example, the model learner 121-4 may allow the data recognition model to learn by using a learning algorithm including an error back-propagation method or a gradient descent method.

As an example, the model learner 121-4 may allow the data recognition model to learn through supervised learning using the learning data as an input value. As another example, the model learner 121-4 may allow the data recognition model to learn through unsupervised learning which enables the data recognition model to learn types of data necessary for determining a situation and learn out the criteria for determining a situation for itself without supervision. As still another example, the model learner 121-4 may allow the data recognition model to learn through reinforcement learning using a feedback as to whether a result of the situation determination according to the learning is correct.

In response to the data recognition model being learned, the model learner 121-4 may store the learned data recognition model. In this case, the model learner 121-4 may store the learned data recognition model in the memory 160 of the display apparatus 100 or in a memory of the server 200 which is connected with the display apparatus 100 through a wired and/or wireless network.

In this case, the memory 160 may store instructions or data related to at least one other component of the display apparatus 100 together with the learned data recognition model. Further, the memory 160 may store software and/or a program. The program may include kernel, middleware, an application programming interface (API), and/or an application program (i.e., "application"), for example.

The model evaluator 121-5 may input evaluation data in the data recognition model, and in response to a recognition result outputted from the evaluation data not satisfying predetermined criteria, allow the model learner 121-4 to learn again. In this case, the evaluation data may be predetermined data for evaluating the data recognition model.

In an initial stage of building a recognition model, the evaluation data may be an image frame with respect to two types of objects and then may be replaced with a set of image frames where types of objects increase. The model evaluator 121-5 may verify the performance of the data recognition model gradually through this operation.

By way of example, in response to the number or a ratio of the evaluation data where the recognition result is incorrect among the recognition results of the learned data recognition model with respect to the evaluation data exceeding a predetermined threshold value, the model evaluator 121-5 may evaluate that the data recognition model does not satisfy the predetermined criterion. For example, it is assumed that there are 1,000 evaluation data, and the predetermined criterion is defined as 2%. In this case, in response to the learned data recognition model outputting incorrect recognition results with respect to more than 20 evaluation data, the model evaluator 121-5 may evaluate that the learned data recognition model is not suitable.

In response to a plurality of learned data recognition models being present, the model evaluator 121-5 may evaluate whether the respective learned data recognition models satisfy the predetermined criterion and decide a model satisfying the predetermined criterion as a final data recognition model. In this case, in response to a plurality of models satisfying the predetermined criterion, the model evaluator 121-5 may decide any predetermined model or a certain number of models as the final data recognition model in the order of highest evaluation scores.

At least one of the data acquirer 121-1, the preprocessor 121-2, the learning data selector 121-3, the model learner 121-4, and the model evaluator 121-5 in the data learner 121 may be realized as at least one hardware chip and installed in the display apparatus. By way of example, at least one of the data acquirer 121-1, the preprocessor 121-2, the learning data selector 121-3, the model learner 121-4, and the model evaluator 121-5 may be realized as the dedicated hardware chip for the AI or realized as a part of a general-purpose processor (e.g., a CPU or an application processor) or a dedicated graphics processor (e.g., a GPU or an ISP) and installed in the above-described various display apparatuses.

Further, the data acquirer 121-1, the preprocessor 121-2, the learning data selector 121-3, the model learner 121-4, and the model evaluator 121-5 may be installed in one electronic apparatus or installed in different electronic apparatuses, respectively. For example, some of the data acquirer 121-1, the preprocessor 121-2, the learning data selector 121-3, the model learner 121-4, and the model evaluator 121-5 may be included in the display apparatus 100, and the other may be included in the server 200.

At least one of the data acquirer 121-1, the preprocessor 121-2, the learning data selector 121-3, the model learner 121-4, and the model evaluator 121-5 may be realized as a software module. In response to at least one the data acquirer 121-1, the preprocessor 121-2, the learning data selector 121-3, the model learner 121-4, and the model evaluator 121-5 being realized as a software module (or a program module including instructions), the software module may be stored in the non-transitory computer readable medium. In this case, at least one software module may be provided by the OS or by a certain application. Further, some of the at least one software module may be provided by the OS, and the other may be provided by the certain application.

Figure 4B:
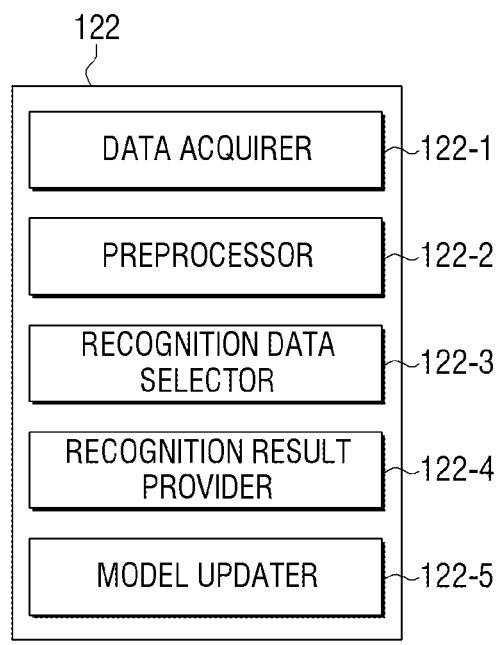
FIG. 4B is a block diagram illustrating a data recognizer according to an example embodiment.

FIG. 4B is a block diagram illustrating a data recognizer 122 according to some embodiments disclosed herein. Referring to FIG. 4B, the data recognizer 122 according to some embodiments may include a data acquirer 122-1, a preprocessor 122-2, a recognition data selector 122-3, a recognition result provider 122-4, and a model updater 122-5.

The data acquirer 122-1 may acquire the data necessary for determining a situation. The preprocessor 122-2 may preprocess the acquired data so as to be used for determining the situation. The preprocessor 122-2 may process the acquired data to be in a predetermined format so the recognition result provider 122-4 uses the acquired data for determining the situation. A detailed description on the recognition result provider 122-4 will be provided below.

The recognition data selector 122-3 may select the data necessary for determining the situation from the preprocessed data. The selected data may be provided to the recognition result provider 122-4. The recognition data selector 122-3 may select some or all of the preprocessed data according to the predetermined criteria for determining the situation. Further, the recognition data selector 122-3 may select the data according to the criteria predetermined by the learning of the model learner 121-4. A detailed description on the model learner 121-4 will be provided below.

The recognition result provider 122-4 may determine the situation by applying the selected data to the data recognition model. The recognition result provider 122-4 may provide a recognition result according to a recognition purpose of the data. The recognition result provider 122-4 may apply the selected data to the data recognition model by using the selected data as an input value. The recognition result may be decided by the data recognition model. For example, the recognition result provider 122-4 may recognize the objects by analyzing the selected image frame according to the criteria decided by the data recognition model.

The model updater 122-5 may update the data recognition model based on evaluation with respect to the recognition result provided by the recognition result provider 122-4. For example, the model updater 122-5 may provide the recognition result received from the recognition result provider 122-4 to the model learner 121-4 so the model learner 121-4 updates the data recognition model.

At least one of the data acquirer 122-1, the preprocessor 122-2, the recognition data selector 122-3, the recognition result provider 122-4, and the model updater 122-5 in the data recognizer 122 may be realized as at least one hardware chip and installed in an electronic apparatus. By way of example, at least one of the data acquirer 122-1, the preprocessor 122-2, the recognition data selector 122-3, the recognition result provider 122-4, and the model updater 122-5 may be realized as a dedicated hardware chip for the AI or realized as a part of a general-purpose processor (e.g., a CPU or an application processor) or a dedicated graphics processor (e.g., a GPU or an ISP) and installed in the above-described various display apparatuses 100.

The data acquirer 122-1, the preprocessor 122-2, the recognition data selector 122-3, the recognition result provider 122-4, and the model updater 122-5 may be installed in one electronic apparatus or installed in different electronic apparatuses, respectively. For example, some of the data acquirer 122-1, the preprocessor 122-2, the recognition data selector 122-3, the recognition result provider 122-4, and the model updater 122-5 may be included in the display apparatus 100, and the other may be included in the server 200.

At least one of the data acquirer 122-1, the preprocessor 122-2, the recognition data selector 122-3, the recognition result provider 122-4, and the model updater 122-5 may be realized as a software module. In response to at least one of the data acquirer 122-1, the preprocessor 122-2, the recognition data selector 122-3, the recognition result provider 122-4, and the model updater 122-5 being realized as a software module (or a program module including instructions), the software module may be stored in the non-transitory computer readable medium. In this case, at least one software module may be provided by the OS or by a certain application. Further, some of the at least one software module may be provided by the OS, and the other may be provided by the certain application.

Figure 5:
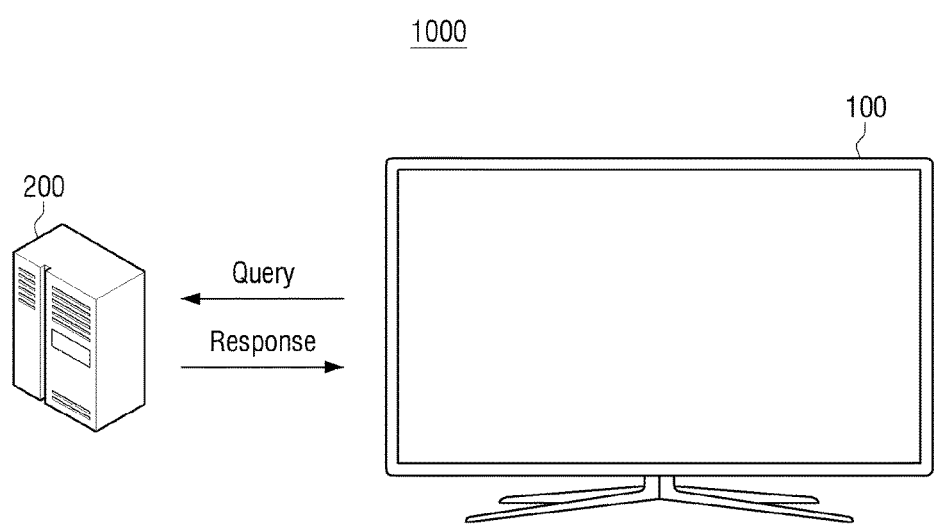
FIG. 5 is a diagram provided to describe a display system according to an example embodiment.

FIG. 5 is a diagram provided to describe a display system 1000 according to an example embodiment. Referring to FIG. 5, the display system 1000 may include a display apparatus 100 and a server 200.

In this case, the display apparatus 100 may include a general-purpose processor, and the server 200 may include an a dedicated processor for the AI. Alternatively, the display apparatus 100 may include one or more applications, and the server 100 may include an OS. The server 200 may be a component which is more integrated or more dedicated or provides less delay, higher performance, and/or a large amount of resources as compared with the display apparatus 100. Accordingly, the server 200 may be a component which is capable of processing a large amount of calculation required to generate, update, or apply the data recognition model more quickly and effectively.

In this case, an interface for transmitting/receiving data between the display apparatus 100 and the server 200 may be defined.

By way of example, an API having learning data to be applied to the data recognition model as a factor value may be defined. The API may be defined as a set of subroutines or functions called from any one protocol (e.g., a protocol defined in the display apparatus 100) for any processing operation of another protocol (e.g., a protocol defined in the server 200). That is, an environment where any one protocol performs an operation of another protocol may be provided through the API.

In FIG. 5, the display apparatus 100 may send a query to the server 200 and receive a response from the server 200. For example, the display apparatus 100 may send a query including the fingerprint to the server 200 and receive a response including the content information from the server 200. The content information may include at least one of a location of a current frame in the entire content, a play time, a content title, a content ID, cast members in the current frame, an object (e.g., a product) in the current frame, a content genre, and series information.

As another example, the display apparatus 100 may send a query including the current frame to the server 200 and receive a response including a recognition result with respect to the objects included in the current frame.

The display apparatus 100 may perform ACR and object recognition, or the server 200 may perform ACR and object recognition. The following example embodiment relates to an example where the server 200 performs ACR and object recognition, but the display apparatus 100 may operate independently.

Figure 6:
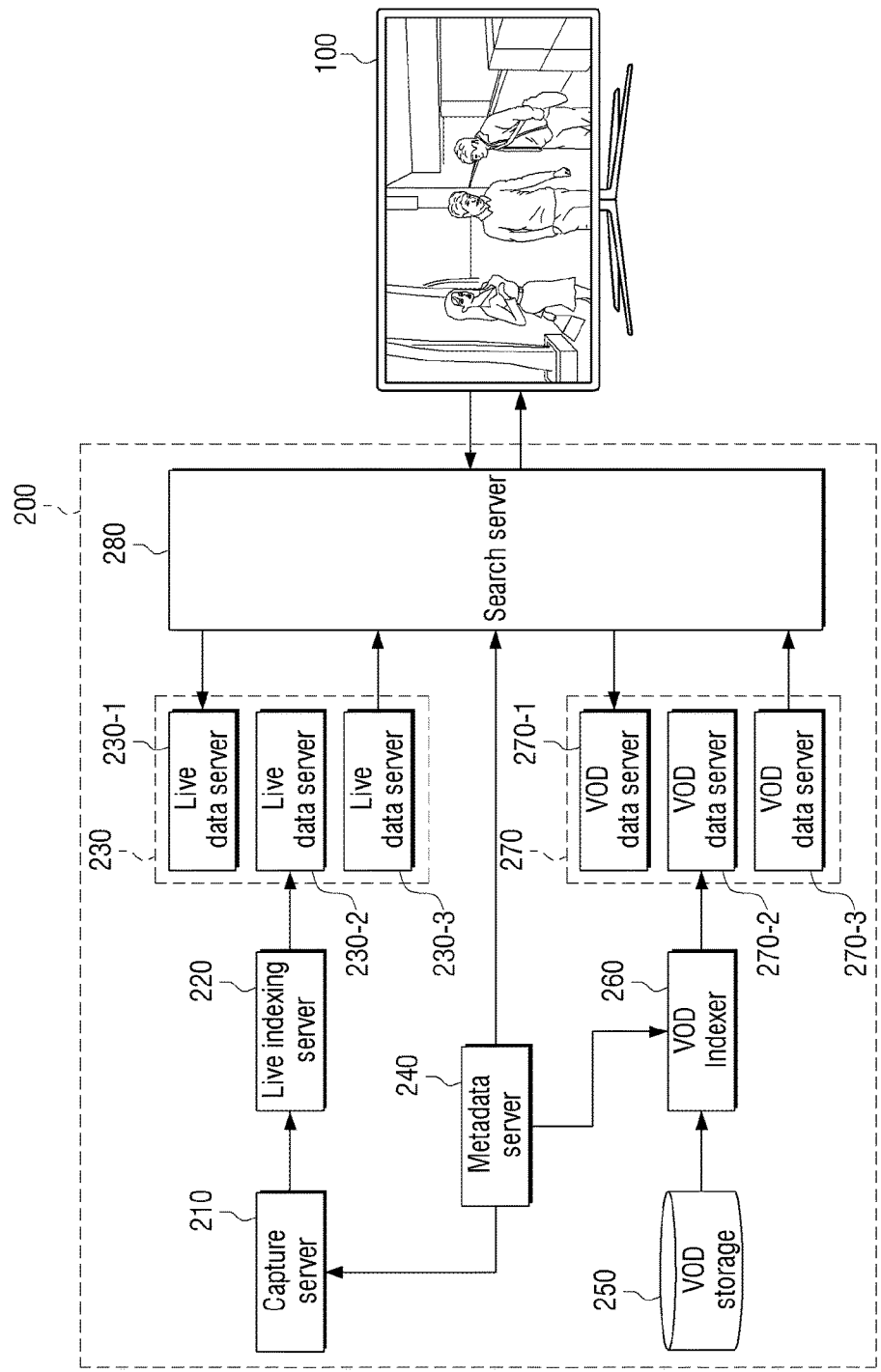
FIG. 6 is a diagram provided to describe an ACR operation.

FIG. 6 is a diagram provided to describe an ACR operation. In the example embodiment of FIG. 6, the display apparatus 100 may generate a fingerprint by periodically extracting a feature of a displayed screen. Subsequently, the display apparatus 100 may send a query for the content information corresponding to the generated fingerprint to the server 200. The server 200 may perform ACR to the real-time broadcasting and ACR to the VOD, respectively.

The fingerprint refers to feature data extracted from a video signal or an audio signal included in respective frames. The fingerprint may reflect intrinsic features of a signal unlike the metadata based on text. By way of example, in response to a signal included in a frame being an audio signal, the fingerprint may be data representing features of the audio signal, such as, a frequency or an amplitude. In response to a signal included in a frame being a video signal (or a still image), the fingerprint may be data representing features of the video signal, such as a motion vector or a color.

In FIG. 6, the server 200 consists of multiple devices, but single server 200 may perform all functions. Referring to FIG. 6, the server 200 may include a capture server 210, a live indexing server 220, a live data server 230, a metadata server 240, a VOD storage 250, a VOD indexer 260, a VOD data server 270, and a search server 280.

In order to perform ACR to the real-time broadcasting, the capture server 210 may extract the respective image frames from a broadcast signal. Subsequently, the capture server 210 may generate a fingerprint by analyzing the extracted frames. In the case of the real-time broadcasting, the capture server 210 may receive image information corresponding to a few seconds in advance of the display apparatus 100. The capture server 210 may receive an electronic program guide (EPG) data including channels and a broadcasting time from the metadata server 240. The capture server 210 may determine the content of the currently received broadcast signal and a location of the current frame in the entire content by using the EPG data.

The live indexing server 220 may store the fingerprint data and the content information received from the capture server 210 in a plurality of the live data servers 230. For example, the live indexing server 220 may transmit the fingerprint data and the content information for each broadcasting channel and each content to one of the plurality of the live data server 230.

The search server 280 may search for a fingerprint corresponding to the fingerprint included in the query from the live data server 230 in response to the query with respect to the real-time broadcasting. The search server 280 may transmit the content information corresponding to the searched fingerprint to the display apparatus 100.

In the case of ACR for the VOD, the VOD to be serviced may be stored in the VOD storage 250. The VOD is distinct from the real-time broadcasting in that the server 200 may have information on all image frames of the VOD. The server 200 may generate a fingerprint with respect to the respective VOD stored in the VOD storage 250. The VOD indexer 260 may match the metadata of the VOD received from the metadata server 270 with the fingerprint and store the VOD and the fingerprint in a plurality of the VOD data servers 270. The metadata of the VOD may include a title, a genre, a director, a writer, casting members, or a play time of a program or content.

The search server 280 may search for a corresponding fingerprint from the VOD data server 270 in response to the query to the VOD. Subsequently, the search server 280 may transmit the content information corresponding to the searched fingerprint to the display apparatus 100.

As described above, the display apparatus 100 may transmit the fingerprint to the server 200 and request for content information corresponding to the fingerprint. The server 200 may search for a corresponding fingerprint from the live data server 230 or the VOD data server 270 according to whether the requested content is the real-time broadcasting or the VOD. The server 200 may transmit the content information corresponding to the searched fingerprint to the display apparatus 100.

Figure 7:
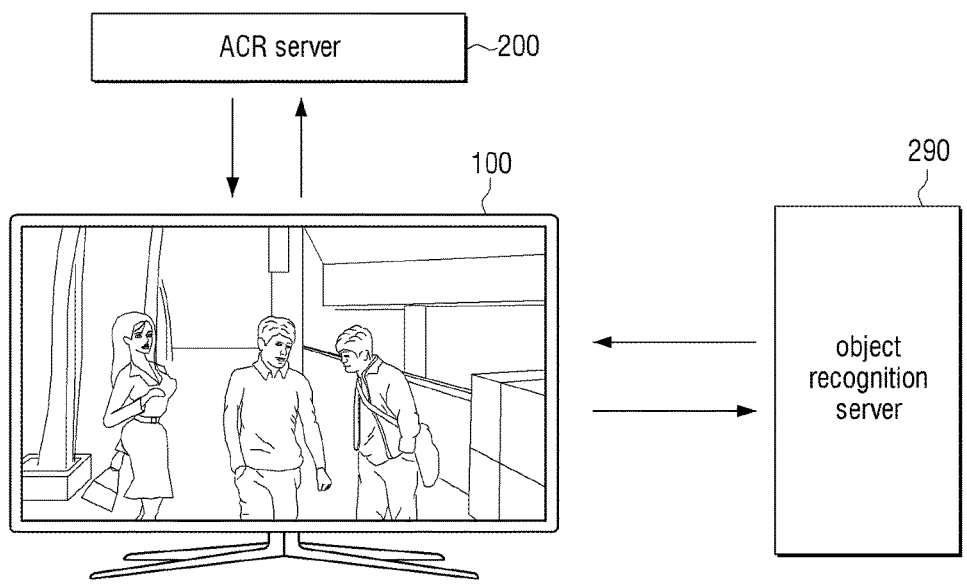
FIG. 7 is a diagram provided to describe an operation of recognizing an object.

FIG. 7 is a diagram provided to describe an operation of recognizing an object. The display apparatus 100 may receive the content information from the server 200 and determine which content includes the current frame and which place the current frame is in the content. Further, the display apparatus 100 may transmit the current image frame data to an object recognition server 290. The object recognition server 290 may recognize the objects in the received image frame. FIG. 7 illustrates that the server 200 providing the ACR function and the object recognition server 290 are separate apparatuses, but the same server may perform ACR and object recognition. Further, as described above, object recognition may be performed by the display apparatus 100 according to an example embodiment.

The method for recognizing an object will be described below in further detail with reference to FIGS. 8A and 8B. The display apparatus 100 or the object recognition server 290 may recognize an object corresponding to a product in the displayed screen. In the following description, it is assumed that the display apparatus 100 performs the object recognition for convenience in explanation.

The display apparatus 100 may recognize an object corresponding to a person as well as the object corresponding to a product. As the information on the person in the current screen may be obtained from the content information, and the display apparatus 100 may be realized so as to mostly recognize the object corresponding to a product in the displayed screen.

Figure 8A:
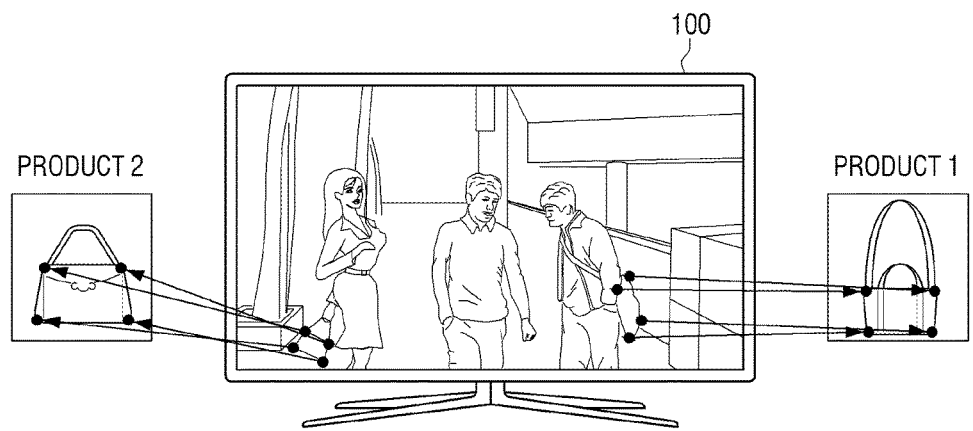
FIG. 8A is a diagram provided to describe a method for recognizing an object by extracting a feature point.

FIG. 8A is a diagram provided to describe a method for recognizing an object by extracting a feature point. The display apparatus 100 may extract one or more feature points from the displayed screen and match the extracted feature point with pre-stored product images. According to the matching result, the display apparatus 100 may determine which product corresponds to the object.

As an example, the display apparatus 100 may extract the feature point from an image. The feature point is not changed by a size or rotation of the image, and an outer part of an object or a portion including letters or shapes (e.g., logos) may be extracted as the feature point. As another example, the display apparatus 100 may extract the feature point which is not changed by condition changes, such as, a scale, lighting, or a point of view, from several image frames.

Figure 8B:
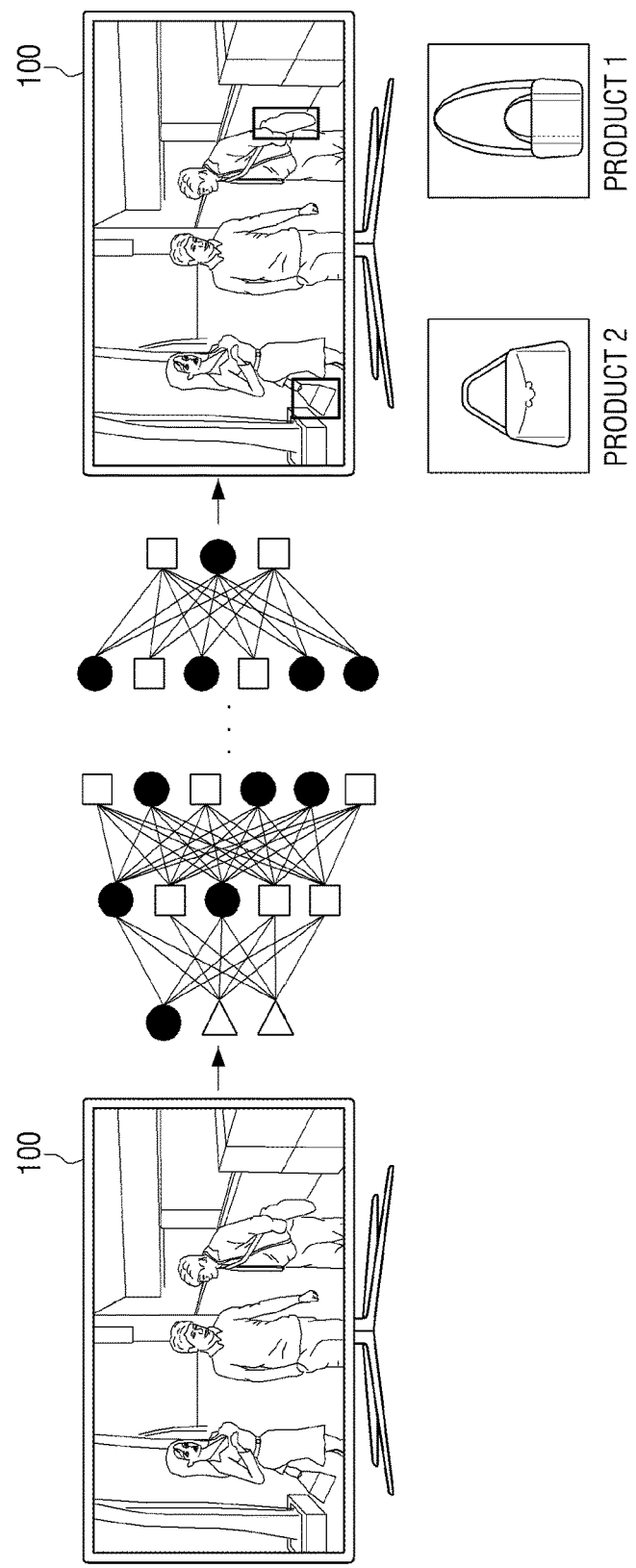
FIG. 8B is a diagram provided to describe a method for recognizing an object through learning.

FIG. 8B is a diagram provided to describe a method for recognizing an object through learning. The display apparatus 100 may recognize a product displayed in the screen by learning through the AI. The display apparatus 100 may learn the criteria for distinguishing the objects through the supervised learning or unsupervised learning.

For example, the display apparatus 100 may learn the physical features for distinguishing images by comparing a plurality of image frames. The display apparatus 100 may learn the criteria for image analysis through a ratio of a foreground and a background, a size of objects, a location of objects, or an arrangement in the image frames.

The display apparatus 100 may recognize the objects displayed in the screen based on the learned criteria for image analysis.

Figure 9:
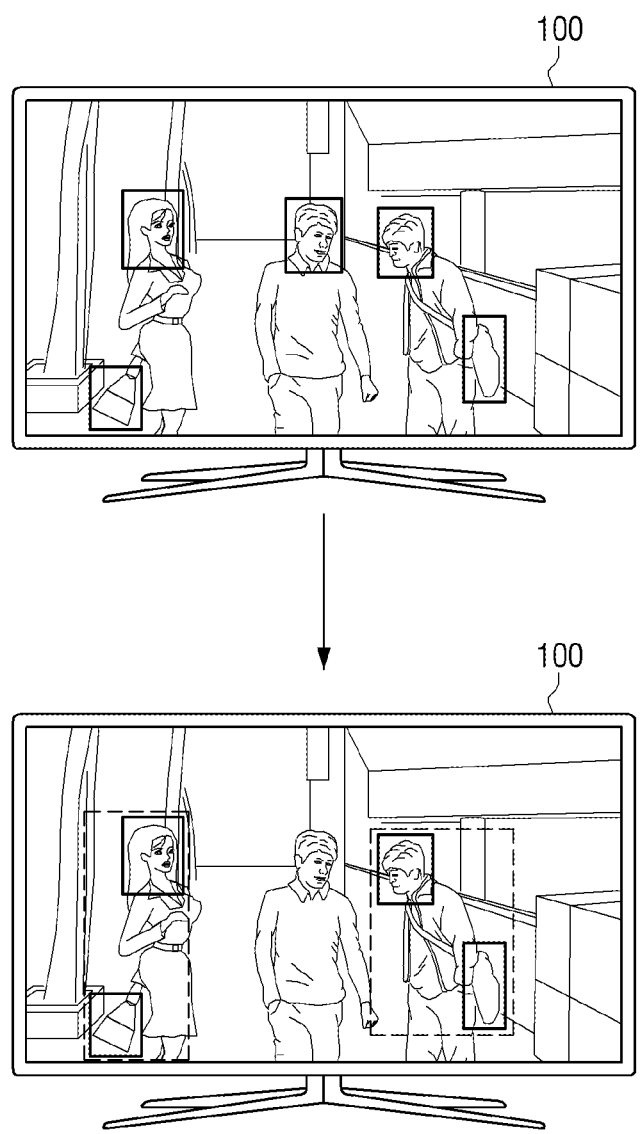
FIG. 9 is a diagram provided to describe object clustering.

FIG. 9 is a diagram provided to describe object clustering. According to the methods of FIGS. 8A and 8B, the display apparatus 100 may recognize the object corresponding to a product. The display apparatus 100 may cluster the recognized products 1 and 2 with corresponding persons (e.g., persons most closely associated with products 1 and 2, respectively). Subsequently, the display apparatus 100 may match and store the clustered objects with the respective image frames.

The display apparatus 100 may recognize the object corresponding to a person in the displayed screen based on the metadata of the content acquired in the ACR process. The metadata may include the information on the persons in the respective frames. For example, the display apparatus 100 may cluster the objects of main characters in the displayed content in priority since the users of the display apparatus 100 show interests in the products of the main characters.

The top drawing of FIG. 9 illustrates an example where the display apparatus 100 recognizes three persons and two products, and the bottom drawing of FIG. 9 illustrates an example where the display apparatus 100 performed the object clustering.

The display apparatus 100 may filter out a person in the middle who is not a main character from among the recognized three persons by using the metadata. Subsequently, the display apparatus 100 may determine relation between the recognized persons and products based on the locations in the displayed screen. In response to determining that the recognized persons and products are related, the display apparatus 100 may cluster the recognized persons and products. In response to determining that the recognized persons and products are unrelated, the display apparatus 100 may filter out the products.

In FIG. 9, the display apparatus 100 may determine that the two recognized products are related to the person on the right and the person on the left, respectively, based on the locations of the products and the persons in the screen. The display apparatus 100 may determine who the person on the right and the person on the left are based on the metadata and may cluster the product objects and the person objects so as to be represented by a person's name.

By the above operation, the display apparatus 100 may sort the recognized objects based on the information in which the user are interested, for example, "bag of a male main character" or "bag of a female main character."

In the case of the real-time broadcasting, the above-described object recognition and clustering operations may be performed in real time. In the case of the VOD, the object recognition and clustering operations for the respective frames may be completed in advance, and the information on the clustered objects may be put into a database.

According to an example embodiment disclosed herein, the display apparatus 100 may determine a user who is using the display apparatus 100. As an example, the display apparatus 100 may collect the biometric information on the user. Subsequently, the display apparatus 100 may determine a user who is using the display apparatus 100 by comparing the collected biometric information with pre-stored biometric information. To be specific, the display apparatus 100 may recognize a fingerprint of the user by using a remote controller or recognize an iris of the user by using a camera.

As another example, the display apparatus 100 may photograph a certain area where the user is located in front of the display apparatus 100 by using a camera. The display apparatus 100 may determine a user in the photographed image as a user who is using the display apparatus 100.

The display apparatus 100 may collect and store log information, a selection history (e.g., a click history) with respect to relevant information, gender information, age information, or genre preference information on the respective users. As an example, the display apparatus 100 may store information inputted by the users and information collected from the use history of the display apparatus 100. As another example, the display apparatus 100 may communicate with Internet of things (IoT) apparatuses and store information which the IoT apparatuses collected by tracking the users.

The display apparatus 100 may select one object from among the clustered objects by using the information on the determined user and provide a service related to the selected object.

For example, the display apparatus 100 may select an object clustered as a character with the same gender and similar age based on the gender information and the age information on the determined user. In response to the determined user being a woman, the display apparatus 100 may select a bag of the female main character of FIG. 9. The display apparatus 100 may provide a shopping application that provides a service for the user to purchase the bag of the female main character.

In response to determining that there is one user, the display apparatus 100 may provide a service suitable for the determined user, but in response determining that there are multiple users, the display apparatus 100 may decide which user will be provided with a more suitable service. For example, in response to determining that two users are watching the content played in the display apparatus 100 through the camera, the display apparatus 100 may decide which user of the two users will be provided with the more suitable service.

Figure 10:
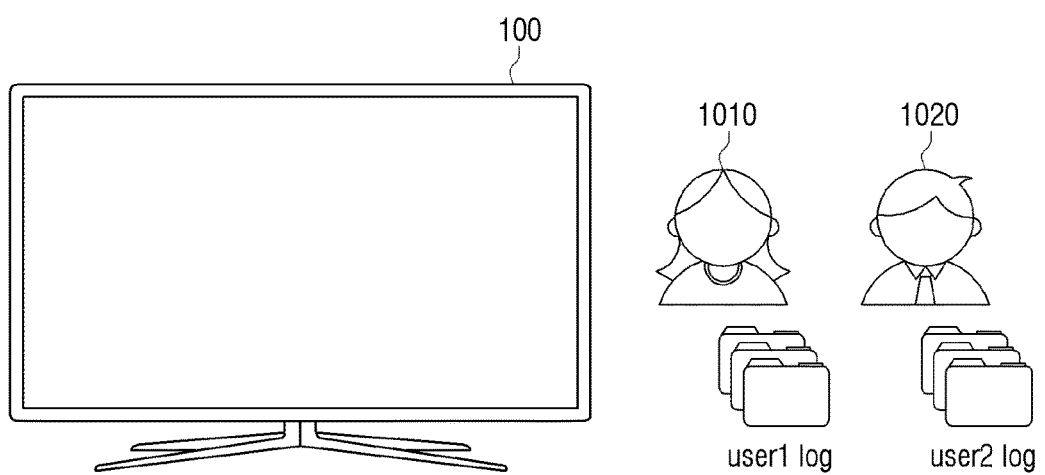
FIG. 10 is a diagram provided to describe an example where a display apparatus stores information on a plurality of users.

The display apparatus 100 may store information on a plurality of users. Referring to FIG. 10, the display apparatus 100 may collect and store information on a first user 1010 and a second user 1020. The display apparatus 100 may decide a preference ranking of the objects clustered in the current screen. For example, the display apparatus 100 may decide the preference ranking of the clustered products by highest sale volume.

The display apparatus 100 may determine the preference of the plurality of users for the object in the highest rank. For example, the display apparatus 100 may determine the preference of the first user 1010 and the second user 1020 for the bag of the female main character determined as being the most preferred. The display apparatus 100 may determine that the preference of the first user 1010 for the bag of the female main character is higher than the preference of the second user 1020 based on the stored information on the plurality of users. The display apparatus 100 may decide the user of the display apparatus 100 as the first user 1010 with respect to the current screen (e.g., current frame). Subsequently, the display apparatus 100 may provide the service related to the bag of the female main character to the determined first user 1010.

As described above, in the case of the plurality of users using the display apparatus 100, the display apparatus 100 may determine a more suitable user to be provided with the service. The display apparatus 100 may select one of the plurality of users every time the screen is changed. That is, the display apparatus 100 may provide a service suitable for the first user 1010, and in response to a screen including a product preferred by the second user 1020 being displayed, provide a service suitable for the second user 1020.

The display apparatus 100 may determine a user of the display apparatus 100 and provide a personalized ACR-based service to the determined user.

Figure 11:
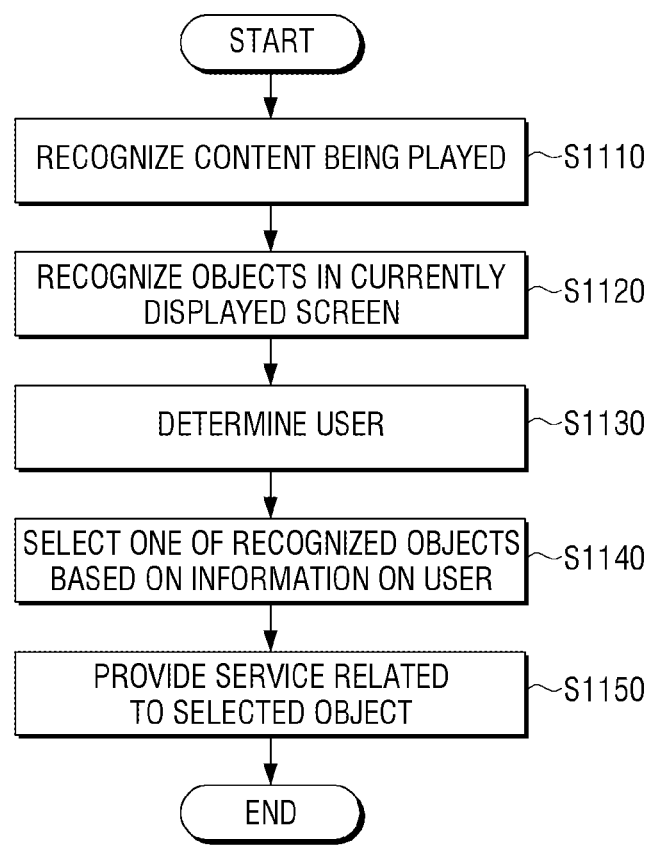
FIGS. 11 and 12 are flowcharts provided to describe a method for providing a service of a display apparatus according to an example embodiment.

FIG. 11 is a flowchart provided to describe a method for providing a service of the display apparatus 100 according to an embodiment disclosed herein. Referring to FIG. 11, the display apparatus 100 may recognize content being played (S1110). For example, the display apparatus 100 may recognize the content through a server-ACR method of requesting for content information on the current screen by transmitting a fingerprint generated by extracting the feature of the currently displayed screen to the server 200.

Further, the display apparatus 100 and/or the server 200 may recognize one or more objects in the currently displayed screen of the content (S1120). As an example, the display apparatus 100 may recognize the objects by using a feature point extraction algorithm. As another example, the display apparatus 100 may learn the criteria for image analysis by using the AI. The display apparatus 100 may recognize the objects in the displayed screen by using the learned criteria.

The display apparatus 100 may determine a user who is using the display apparatus 100 (S1130). The display apparatus 100 may provide the personalized ACR-based service by using the preference information on the determined user. As an example, the display apparatus 100 may determine a user who is using the display apparatus 100 by collecting the biometric information on the user, such as, a fingerprint. As another example, the display apparatus 100 may extract a user from an image photographed by the camera by using a face recognition algorithm.

The display apparatus 100 may select one of the recognized objects based on the information on the determined user (S1140). Subsequently, the display apparatus 100 may provide the service related to the selected object (S1150). By selecting an object preferred by the user from among the plurality of objects recognized from the displayed screen, the display apparatus 100 may provide a personalized service.

Figure 12:
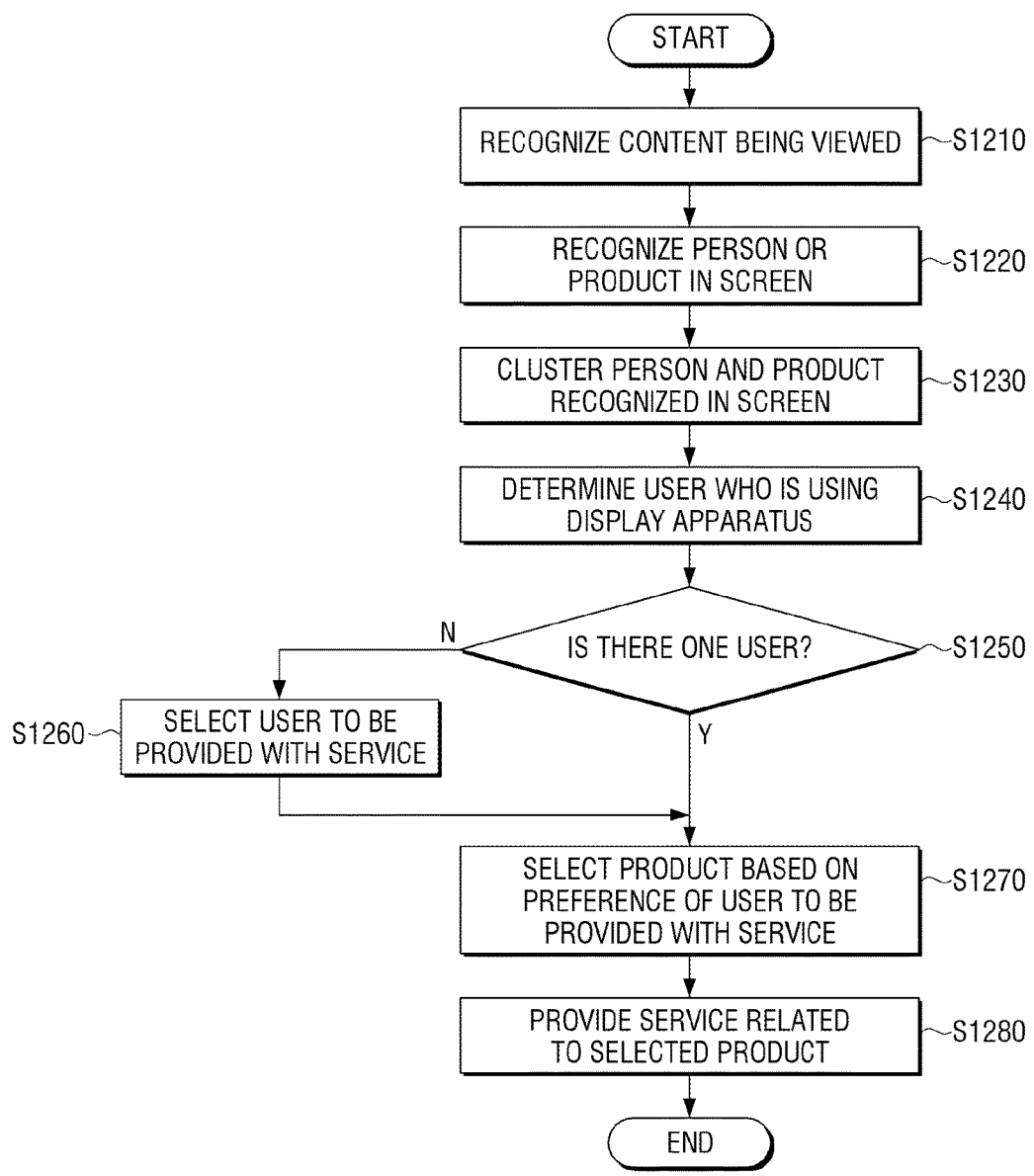

FIG. 12 is a flowchart provided to describe a method for providing a service of the display apparatus 100 according to an example embodiment. Referring to FIG. 12, the display apparatus 100 may recognize the content being viewed (S1210). The display apparatus 100 may determine what the currently played content is by matching a fingerprint generated from the currently displayed screen with a fingerprint stored in the server 200.

The display apparatus 100 and/or the server 200 may recognize a person or a product in the screen (S1220). The display apparatus 100 may distinguish the objects in the screen by extracting the feature point from the currently displayed content screen or by using the AI learning. Subsequently, the display apparatus 100 may cluster the person and product recognized in the screen (S1230). The display apparatus 100 may determine a main character of the content by using the metadata and cluster the product located close to the main character as a product which the main character uses.

The display apparatus 100 may determine (e.g., identify) a user who is using the display apparatus 100 (S1240). As an example, the display apparatus 100 may use the biometric information, such as, recognition of a fingerprint, an iris, or a voiceprint. As another example, the display apparatus 100 may recognize a user who is viewing the content by using the camera.

In response to determining that there is one user (S1250-Y), the display apparatus 100 may provide a service suitable for the determined user. In response to determining that there are multiple users (S1250-N), the display apparatus 100 may select a user to be provided with a service (S1260). For example, the display apparatus 100 may target a user to be provided with a service by considering the information on the person in the screen and the gender, age, and preference of the determined multiple users.

In response to a user to be provided with a service being decided, the display apparatus 100 may select a product based on the preference of the determined user (S1270). The display apparatus 100 may collect profile information or preference information on the user. For example, the display apparatus 100 may collect account information inputted by the user or use information on the IoT apparatuses around the display apparatus 100. The display apparatus 100 may select a product which is the most preferred by the user from among the recognized products based on the collected information.

Subsequently, the display apparatus 100 may provide a service related to the selected product (S1280).

The term "unit" in the description includes a unit consisting of hardware, software, or firmware and may be compatible with the terms of logic, logic block, component, or circuit, for example. The "module" may refer to single component or refer to the smallest unit or a part thereof which performs one or more functions. By way of example, the module may include an application-specific integrated circuit (ASIC).

The various embodiments of the present disclosure may be realized as software including instructions stored in a machine-readable storage medium which is readable by a machine (e.g., a computer). The machine may be an apparatus which is capable of calling the instructions stored in the storage medium and operating by the instructions. The machine may include an electronic apparatus according to the example embodiments disclosed herein. In response to the instructions being executed by a processor, the processor may perform the functions corresponding to the instructions itself or control other components to perform the functions. The instructions may include a code which is generated or executed by a compiler or an interpreter. The machine-readable storage medium may be provided in a form of a non-transitory storage medium. In this case, the term "non-transitory" only signifies that the storage medium does not include a signal and is tangible, regardless of whether data is stored in the storage medium semi-permanently or temporarily.

The methods of the example embodiments disclosed herein may be included and provided in a computer program product. The computer program product may be transacted between a seller and a buyer as a product. The computer program product may be distributed in a form of the machine-readable storage medium (for example, a compact disc read-only memory (CD-ROM)) or distributed online through an application store (e.g., Play Store™). When the computer program product is distributed online, at least a part of the computer program product may be temporarily stored or generated in a storage medium, such as, a server or a manufacturer, a server of the application store, or a memory of a relay server.

The respective components of the various example embodiments (e.g., modules or programs) may consist of single sub-component or a plurality of sub-components. Some of the sub-components may be omitted, or other sub-component may be added to the components of the various example embodiments. Additionally or alternatively, some components (e.g., modules or programs) may be integrated as one component and perform the functions of the respective components before integration in the same or similar manner. The operations performed by the modules, programs, or other components of the various embodiments may be performed in a sequential, parallel, repetitive, or heuristic order. At least some of the operations may be performed in a different order or omitted, and other operation may be added.

What is claimed is:

1. A display apparatus comprising:
a display;
a communicator; and
a processor configured to:
control the display to display content,
recognize the content being displayed,
recognize one or more objects in a currently displayed screen of the content,
identify a user who is using the display apparatus,
select one of the recognized one or more objects based on information on the identified user, and
provide a service related to the selected one of the recognized one or more objects to the identified user,
wherein the processor is further configured to:
recognize a first object corresponding to a product in the currently displayed screen,
recognize a second object corresponding to a person in the currently displayed screen based on metadata of the recognized content, and
filter out the first object in response to identifying that the person and the product are unrelated, and
wherein the processor is further configured to:
control the communicator to communicate with a server,
obtain a fingerprint by extracting a feature of the currently displayed screen,
control the communicator to send a query for content information corresponding to the obtained fingerprint to the server, and
recognize the content by using the content information received from the server.

2. The display apparatus as claimed in claim 1, wherein the processor is further configured to cluster the recognized first and second objects.

3. The display apparatus as claimed in claim 2, wherein the processor is further configured to:
identify a relation between the person and the product based on locations in the currently displayed screen, and
cluster the recognized first and second objects in response to identifying that the person and the product are related.

4. The display apparatus as claimed in claim 1, wherein the processor is further configured to, in response to the identified user being a plurality of users, the identify one of the plurality of users as the user who is using the display apparatus for every screen of the content.

5. The display apparatus as claimed in claim 4, wherein the processor is further configured to identify a preference ranking of the one or more objects and identify the user based on a highest preference for an object in a highest rank among the plurality of users.

6. The display apparatus as claimed in claim 1, further comprising an input interface,
wherein the processor is further configured to:

control the input interface to receive biometric information on the user, and identify the user who is using the display apparatus by comparing the biometric information received through the input interface and pre-stored biometric information.

7. The display apparatus as claimed in claim 1, further comprising a camera, wherein the processor is further configured to:

control the camera to photograph an image, and identify the user included in the image of a predetermined area photographed by the camera.

8. A method for providing a service of a display apparatus, the method comprising:

recognizing content being played;

recognizing one or more objects in a currently displayed screen of the content;

identifying a user who is using the display apparatus;

selecting one of the recognized one or more objects based on information on the identified user; and providing the service related to the selected one of the recognized one or more objects to the identified user, wherein the recognizing the one or more objects comprises:

recognizing a first object corresponding to a product in the currently displayed screen, recognizing a second object corresponding to a person in the currently displayed screen based on metadata of the recognized content, and filtering out the first object in response to identifying that the person and the product are unrelated, and wherein the recognizing the content comprises:

obtaining a fingerprint by extracting a feature of the currently displayed screen, sending a query for content information corresponding to the obtained fingerprint to a server, and recognizing the content by using the content information received from the server.

9. The method as claimed in claim 8, wherein the recognizing the one or more objects comprises clustering the recognized first and second objects.

10. The method as claimed in claim 9, wherein the clustering the recognized first and second objects comprises:

identifying a relation between the person and the product based on locations in the currently displayed screen; and clustering the recognized first and second objects in response to identifying that the person and the product are related.

11. The method as claimed in claim 8, wherein the identifying the user comprises, in response to the identified user being a plurality of users, identifying one of the plurality of users as the user who is using the display apparatus for every screen of the content.

12. The method as claimed in claim 11, wherein the identifying the user comprises:

identifying a preference ranking of the one or more objects; and identifying the user based on a highest preference for an object in a highest rank among the plurality of users.

13. The method as claimed in claim 8, wherein the identifying the user comprises:

receiving biometric information on the user; and identifying the user who is using the display apparatus by comparing the received biometric information and pre-stored biometric information.

14. The method as claimed in claim 8, wherein the identifying the user comprises:

photographing an image of a predetermined area in front of the display apparatus; and identifying the user included in the photographed image.

15. A display apparatus using an artificial intelligence (AI) neural network model, the display apparatus comprising:

a display;

a communicator configured to communicate with a server; and a processor configured to:

control the display to display content, recognize the content being displayed, recognize one or more objects in a currently displayed screen of the content by inputting the recognized content in the AI neural network model, identify a user who is using the display apparatus, select one object of the recognized one or more objects based on information on the identified user, and provide a service related to the selected one of the recognized one or more objects to the identified user, wherein the processor is further configured to:

recognize a first object corresponding to a product in the currently displayed screen, recognize a second object corresponding to a person in the currently displayed screen based on metadata of the recognized content, and filter out the first object in response to identifying that the person and the product are unrelated, and wherein the processor is further configured to:

control the communicator to communicate with the server, obtain a fingerprint by extracting a feature of the currently displayed screen, control the communicator to send a query for content information corresponding to the obtained fingerprint to the server, and recognize the content by using the content information received from the server.

16. The display apparatus as claimed in claim 15, wherein the processor is further configured to cluster the recognized first and second objects.

17. The display apparatus as claimed in claim 16, wherein the processor is further configured to:

identify a relation between the person and the product based on locations in the currently displayed screen, and cluster the recognized first and second objects in response to identifying that the person and the product are related.

* * * * *